(12) United States Patent
Glance

(10) Patent No.: US 6,292,298 B1
(45) Date of Patent: Sep. 18, 2001

(54) METHOD AND APPARATUS FOR REALIZING AN OPTICAL MULTIPLEXER/ DEMULTIPLEXER

(75) Inventor: Bernard Glance, Colts Neck, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/309,443

(22) Filed: May 11, 1999

Related U.S. Application Data

(60) Provisional application No. 60/114,285, filed on Dec. 30, 1998.

(51) Int. Cl.[7] .............................. G02B 1/10; G02B 27/14
(52) U.S. Cl. ......................... 359/583; 589/590; 589/633; 589/634; 589/900
(58) Field of Search ..................................... 359/577, 578, 359/580, 589, 590, 124, 125, 126, 127, 629, 633, 634, 636, 638, 583, 900

(56) References Cited

U.S. PATENT DOCUMENTS

| | | | |
|---|---|---|---|
| 5,144,498 | * | 9/1992 | Vincent ................................. 359/885 |
| 5,583,683 | * | 12/1996 | Scobey ................................. 359/589 |
| 5,784,507 | * | 7/1998 | Holm-Kennedy et al. ............. 385/31 |
| 6,008,920 | * | 12/1999 | Hendrix ................................ 359/633 |
| 6,115,178 | * | 9/2000 | Naganuma et al. .................. 359/629 |

FOREIGN PATENT DOCUMENTS

| | | | |
|---|---|---|---|
| 2024202-A | * | 3/1992 | (CA) ..................................... 359/577 |
| 0192224 | * | 10/1984 | (JP) ...................................... 359/589 |

OTHER PUBLICATIONS

P.D. Atherton, et al., "Tunable Fabry–Perot Filters", Optical Engineering, vol. 20, No. 6, pp. 806–814, Nov./Dec. 1981.*

A. Frenkel, et al., "Angle–Tuned Etalon Filters for Optical Channel Selection in High Density Wavelength Division Multiplexed Systems", J. Lightwave Techn., vol. 7, No. 4, pp. 615–624, Apr. 1989.*

* cited by examiner

*Primary Examiner*—Cassandra Spyrou
*Assistant Examiner*—John Juba, Jr.
(74) *Attorney, Agent, or Firm*—Kenyon & Kenyon

(57) ABSTRACT

A method and apparatus for realizing an optical multiplexer/ demultiplexer having a continuous interferometer filter with a single $\lambda/2$ dielectric layer is presented. The continuous interferometer filter is attached to a transparent substrate. One face of the substrate is tilted relative to the opposite face by a small wedge angle "$\delta\emptyset'$". As a result of the small wedge angle "$\delta\emptyset'$" between the faces of the substrate, when a beam of light, composed of differing wavelengths, is introduced into the substrate at an incident angle "$\theta'$" the beam zig-zags between the faces of the substrate at an increasing angle to the incident angle "$\theta'$" proportional to the wedge angle "$67 \emptyset'$". Accordingly, as the beam of light reaches the continuous interferometer filter at a different angle from the incident angle at each point, the filter passes through a wavelength corresponding to that new differing angle.

10 Claims, 2 Drawing Sheets

METHOD AND APPARATUS FOR REALIZING AN OPTICAL MULTIPLEXER/DEMULTIPLEXER

PRIOR PROVISIONAL PATENT APPLICATION

The present application claims the benefit of U.S. Provisional Application No. 60/114,285 filed Dec. 30, 1998.

BACKGROUND OF THE INVENTION

1. Field of the Invention

The present invention relates to a method and apparatus for realizing an optical multiplexer/demultiplexer, and more particularly, to an optical multi-Dlexer/demultiplexer having a continuous interferometer filter with a single $\lambda/2$ dielectric layer.

2. Description of the Art

While fiber optic technology has been recognized as having a large transmission capacity, there remains the issue of increasing the utilization of the bandwidth making up that capacity. Greater bandwidth utilization is necessary as the demand for greater amounts of data transmission, both telephonically and over the Internet, increases for such things as, inter alia, speech and video images and graphics. In an attempt to allow for greater bandwidth utilization over a fiber optic cable, different types of wavelength division multiplexers/demultiplexers (WDM) have been implemented. Most of the WDM's implemented have a number of filters, each tuned to a different waveband. These multi-filter types of WDM's, however, are expensive and cumbersome as each waveband to be utilized in the fiber optic cable must have its own filter. Alternatively, a few attempts have been made to implement WDM's utilizing only one single filter for all of the wavebands.

For example, in U.S. Pat. No. 5,781,341, issued Jul. 14, 1998, to Lee, a WDM is presented having a single tunable optical filter for waveband selection. The filter is tunable in that it is capable of changing direction with respect to an angle of incidence of an incoming beam of light. Such change in direction of the filter is effected by a motor mechanism. The motor mechanism, however, Las many moving parts and thus may be expensive to manufacture and may be subject to frequent breakage. Further, since tunability of the filter is dependent upon its ability to be adjustably moved by the motor mechanism, if there is a breakage the filter is no longer tunable.

Another example, U.S. Pat. No. 5,481,402, issued Jan. 2, 1996, to Cheng et al., also presents a WDM having a single tunable optical filter for waveband selection. In this patent, the filter is tunable in that it is capable of pivoting around a pivot axis, thus changing the passband of the filter in accordance with the angle of incidence. The pivot effect of the filter is effected by a rotating adjustment arm. Again, however, tile moving parts of the filter arrangement may be expensive to manufacture and may be subject to breakage. And also again, since tunability of the filter is dependent upon its ability to be adjustably moved by the rotating adjustment arm, if there is a breakage the filter is no longer tunable.

Yet another example, U.S. Pat. No. 4,671,603, issued Jun. 9, 1987, to McQuoid et al., also presents a WDM having a single tunable filter. However, instead of a filter which is tunable by physical movement, the filter is constructed having differing refractive index layers stacked upon each other for the length of the filter. The differing refractive index layers make the filter tunable in that wavelength selectivity is dependent upon the angle at which the light beam strikes the filter, relative to the original angle of incidence of the light beam. While tunable, the filter may be expensive to manufacture as the filter must have individual layers of differing refractive indexes along its entire length. Further, reflective mirrors, placed on either side of the filter, are needed to redirect the light beam back towards the filter.

Thus, while attempts have been made to present a WDM having only a single filter, none have yet been developed that are easily implemented and inexpensive.

SUMMARY OF THE INVENTION

Accordingly, the present invention provides an inexpensive and easily manufactured optical wavelength multiplexer/demultiplexer that, instead of having many separate bandpass filters each tuned to a particular wavelength, has an interferometer filter with a single $\lambda/2$ dielectric layer mounted on opposing sides of a filter block.

In having only one interferometer filter, the multiplexer/demultiplexer allows wavelengths of different frequencies to pass by introducing a small wedge angle between the two opposing sides of the filter block. Since the two opposing sides of the single bandpass filter are set apart from one another at an ever increasing distance due to the wedge angle, the corresponding angle at which the differing wavelengths strike the filter changes relative to that wedge angle. Accordingly a different frequency is passed through the filter at each new angle.

The present invention, including its features and advantages, will become more apparent from the following detailed description with reference to the accompanying drawings.

DETAILED DESCRIPTION

Figure 1:
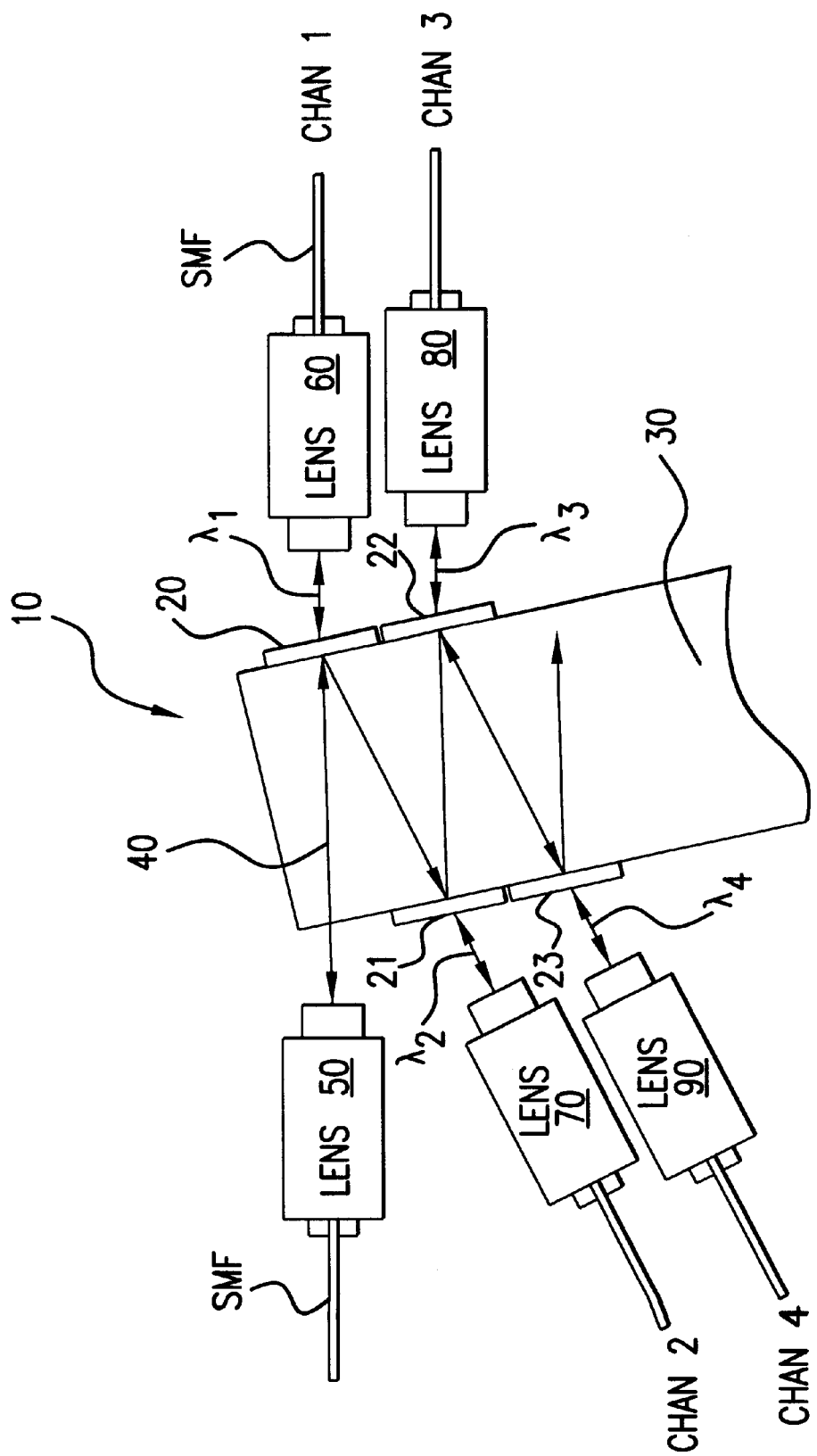
FIG. 1 illustrates an optical wavelength division multiplexer (WDM) having a plurality of ultra-narrow band resonant cavity interference filters, according to the prior art.
Figure 2:
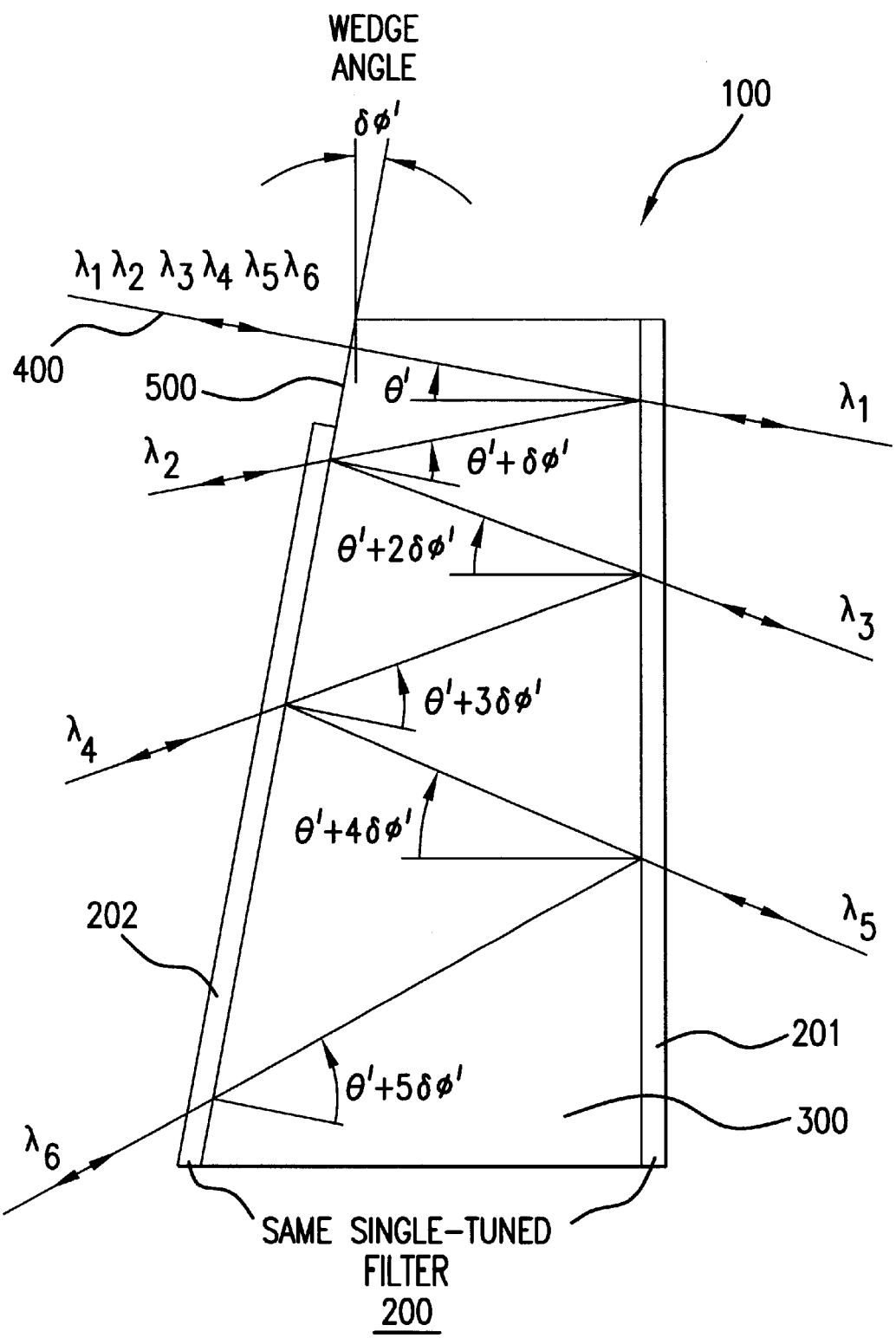
FIG. 2 illustrates an optical wavelength multiplexer/demultiplexer having a continuous interferometer filter with a single $\lambda/2$ dielectric layer mounted on opposing sides of a filter block, according to an embodiment of the present invention.

FIGS. 1 and 2 illustrate incorporating thin-film resonant cavity filters into wavelength division multiplexing components which can be used in broadband fiber-optic communication systems.

Referring to FIG. 1, a filter block 10 has a series of ultra-narrow band resonant cavity interference filters 20, 21, 22 and 23 each mounted parallel to one another and on one side or the other of a transparent substrate 30. Each one of the interference filters 20, 21, 22 and 23 is tuned to a different single wavelength $\lambda_1, \lambda_2, \lambda_3, \lambda_4$, respectively. Thus as a light beam 40, containing a multitude of different wavelengths (i.e., $\lambda_1, \lambda_2, \lambda_3, \lambda_4, \ldots, \lambda_x$), is transmitted from a single mode optical fiber (SMF) and optical Lens 50 through the transparent substrate 30 to the first interference filter 20, only the one specific wavelength A corresponding to the wavelength to which the first interference filter 20 is tuned, will be transmitted as Channel 1 through optical Lens 60. The rest of the wavelengths (i.e., $\lambda_2, \lambda_3, \lambda_4, \ldots, \lambda_x$) of light beam 40 are reflected back through the transparent substrate 30 to the next interference filter in line. As the light beam 40 thus cascades down the transparent substrate 30 in this way, a different wavelength is removed at each different filter. Accordingly, wavelength $\lambda_2$ will be transmitted to optical Lens 70 as Channel 2 through interference filter 21, wavelength $\lambda_3$ will be transmitted to optical Lens 80 as Channel 3 through interference filter 22, and wavelength $\lambda_4$ will be transmitted to optical Lens 90 as Channel 4 through interference filter 23. The transmitting through of the different wavelengths, of course, continues for as many lenses and filters as are contained in the optical wavelength division multiplexer.

Referring to FIG. 2, a filter block 100 has an identical continuous interferometer filter 200, constructed with a single $\lambda/2$ dielectric layer, mounted on each side of a transparent substrate 300. One side of the transparent substrate 300 is tilted relative to the opposite side by a small wedge angle "$\delta\varnothing'$", thus changing the distance between each side 201 and 202 of the interferometer filter 200 so that they are not parallel to one another. As a result of the small wedge angle "$\delta\varnothing'$" between sides 201 and 202 of the interferometer filter 200, when a light beam 400 is introduced at a point of entry 500 into transparent substrate 300 at an incident angle "$\theta'$" and repeatedly reflected back and forth between the filter's two opposing sides 201 and 202, the incident angle at which the zig-zagging light beam 400 strikes the filter 200 changes by an angle proportional to the wedge angle after each reflection. For example, when light beam 400 is initially introduced into the transparent substrate 300, the light beam 400 initially strikes side 201 of filter 200 at the original incident angle "$\theta'$". However, as the light beam 400 is reflected back towards side 202 of filter 200, the angle at which it initially strikes side 202 is equal to "$\theta'+\delta\varnothing'$". In this manner then, as a result of the wedge angle and the growing distance between the two sides 201 and 202, the angle at which the light beam 400 strikes the sides 201 and 202 changes upon each successive reflection. Thus, continuing with the above example, upon a second reflection of light beam 400 (i.e., from side 202), the angle at which the light beam strikes side 201 for the second time is "$\theta'+2\delta\varnothing'$". Upon a third reflection of light beam 400 (i.e., from side 201), the angle at which the light beam strikes side 202 for the second time is "$\theta'+3\delta\varnothing'$". Thus, as shown, the change of the angle at which the light beam strikes the sides of the filter continues proportionally to the wedge angle as the light beam cascades down the filter. It is to be noted, of course, that the wedge angle may be of any angle, and may in fact be such that the two opposing sides of the filter, instead of separating at a growing distance, actually draw in towards one another. Further, it is to be noted, of course, that the point of entry through which the light beam is introduced into the substrate may be of any size and also may be placed at any position to allow for such entry and appropriate reflections. Also further, it is to be noted, of course, that a channel spacing (i.e., at which point from the filter the wavelengths are transmitted) can be tuned by simply varying the wedge angle. Lastly, it is to be noted that the filter need not be continuous, and that instead the filter may be mounted on the filter block in a discontinuous manner (e.g., only at those locations where the light beam is to be transmitted or reflected).

As light beam 400 cascades down the transparent substrate 300 reflecting from one side 201 to the other side 202, various wavelengths (i.e., $\lambda_1$, $\lambda_2$, $\lambda_3$, $\lambda_4$, $\lambda_5$, $\lambda_6$, etc.) are transmitted according to the result of the interaction of the inherent property of the interferometer filter 200 and the changing angle at which the zig-zagging light beam 400 strikes the filter 200. This can be seen in that, since the filter is made of a single $\lambda/2$ dielectric layer sandwiched between two highly reflective $\lambda/4$ dielectric stacks (Sese Chapter 7 of the reference "*Thin-Film Optical Filters*" by H. A. Macleod, McGraw-Hill Publishing Company, which is hereby incorporated by reference), the layer $\lambda/2$ forms a Fabry-Perot filter transparent around one of the various wavelengths according to the equation:

$$\lambda = 2nh \cos\theta \qquad (EQ\ 1)$$

where n is the effective dielectric index of the $\lambda/2$ layer, h is the layer thickness and a is the incident angle of the input beam inside the $\lambda/2$ layer. Based on this inherent property filter equation, as $\theta$ is the incident angle of the input beam inside the $\lambda/2$ layer, we can state that $\theta$ differs from its value of the incident angle "$\theta'$", as seen inside the transparent substrate 300, by a quasi-constant coefficient of proportionality close to unity. Further, we can state that $\delta\varnothing$ is the value of the wedge angle "$\delta\varnothing'$" as seen by the $\lambda/2$ layer (differing only by the same quasi-constant coefficient). (The value of the quasi-constant coefficient, which can be determined experimentally for each filter, depends upon the refraction index of the transparent substrate and the effective indexes of the $\lambda/2$ dielectric layer and two reflective $\lambda/4$ dielectric stacks). Accordingly, as light beam 400 zig-zags back and forth between the sides of the filter 200, which one of the various wavelengths will be transmitted from the continuous interferometer filter 200 can be determined by the equation:

$$\lambda_N = 2nh \cos(\theta + (N-1)\delta\varnothing) \qquad (EQ\ 2)$$

Thus, from equations 1 and 2 we derive that the following wavelengths emerge from the single thickness film of the filter:

$$\lambda_1 = 2nh \cos\theta$$

$$\lambda_2 = 2nh \cos(\theta + \delta\varnothing)$$

$$\lambda_3 = 2nh \cos(\theta + 2\delta\varnothing)$$

$$\lambda_N = 2nh \cos(\theta + (N-1)\delta\varnothing)$$

Assuming that $\delta\varnothing \ll 1$, we further (see that equation 2 yields:

$$\lambda_1 = 2nh \cos\theta$$

$$\lambda_2 = 2nh \cos\theta \times [1 + \delta\varnothing \tan\theta]$$

$$\lambda_3 = 2nh \cos\theta \times [1 + 2\delta\varnothing \tan\theta]$$

$$\lambda_N = 2nh \cos\theta \times [1 + (N-1)\delta\varnothing \tan\theta]$$

which shows that the particular wavelength transmitted by the filter 200 increases with an increment proportional to the number of reflections:

$$\frac{\Delta\lambda_p}{\lambda_1} = p\delta\varnothing\tan\theta$$

Thus for a channel interval of 100 GHz and an incident angle $\theta$ equal to 25 degrees, the assumption of $\delta\varnothing \ll 1$ is verified since $\delta\varnothing = 0.06390°$.

Thus, as can be seen from the above description, the present invention is a new and useful improvement over the prior art in that an optical WDM device requiring only one single-tuned filter, instead of the many precisely tuned filters needed in the prior art, can be substantially less costly to fabricate. Further, as there are no moving parts, the filter is far less likely to suffer from malfunction due to breakage, and since there is only a single λ/2 dielectric layer it is easier to manufacture.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. An apparatus for an optical wavelength multiplexer/demultiplexer, comprising:

a transparent substrate, having a first side tilted relative to a second side at a wedge angle; and an identical single λ/2 dielectric layer interferometer filter, mounted on each of the first side and the second side of the transparent substrate, wherein when a light beam, comprising at least one wavelength, enters the transparent substrate, the at least one wavelength is either transmitted or reflected based on the interaction of the interferometer filter and an angle at which the light beam strikes the interferometer filter.

2. The apparatus according to claim 1, further comprising:

a point of entry into the transparent substrate for the light beam.

3. The apparatus according to claim 1, wherein the angle at which the light beam strikes the interferometer filter is a function of an incident angle at which the light beam enters the transparent substrate and a factor of the wedge angle.

4. The apparatus according to claim 1, wherein the single λ/2 dielectric layer interferometer filter is continuous on at least one of the first side and the second side.

5. A method for realizing an optical wavelength multiplexer/demultiplexer, comprising the steps of:

introducing a light beam into a transparent substrate at an incident angle;

transmitting at least one first wavelength of the light beam from a first single λ/2 dielectric layer interferometer filter; and reflecting at least one second wavelength of the light beam from the single λ/2 dielectric layer interferometer filter, to an identical single λ/2 dielectric layer interferometer filter oriented at a non-zero angle with respect to the first interferometer filter, wherein whether the steps of transmitting and reflecting the at least one first and second wavelengths, respectively, are each carried out is based on the interaction of the first interferometer filter and an angle at which the light beam strikes the first interferometer filter.

6. The method according to claim 5, wherein the angle at which the light beam strikes the first interferometer filter is a function of the incident angle at which the light beam is introduced into the transparent substrate and a factor of a wedge angle.

7. The method according to claim 5, wherein the light beam is introduced into the transparent substrate through a point of entry.

8. A method for realizing an optical wavelength multiplexer/demultiplexer, comprising the steps of:

tilting a first side of a transparent substrate relative to a second side of the transparent substrate by a wedge angle;

mounting a single identical λ/2 dielectric layer interferometer filter on both of the first side and the second side of the transparent substrate;

introducing a light beam into the transparent substrate at an incident angle, wherein whether the beam of light is transmitted or reflected by the interferometer filter is based on the interaction of an inherent property of the interferometer filter and an angle at which the light beam strikes the interferometer filter.

9. The method according to claim 8, wherein the angle at which the light beam strikes the interferometer filter is a function of the incident angle at which the light beam is introduced into the transparent substrate and a factor of the wedge angle.

10. The method according to claim 8, wherein the light beam is introduced into the transparent s[]ubstrate through a point of entry.

* * * * *

UNITED STATES PATENT AND TRADEMARK OFFICE
CERTIFICATE OF CORRECTION

PATENT NO. : 6,292,298 B1    Page 1 of 1
DATED : September 18, 2001
INVENTOR(S) : Glance It is certified that error appears in the above-identified patent and that said Letters Patent is hereby corrected as shown below:

Title page,
ABSTRACT, line 11, delete "67" and insert -- $\delta$ --.

Claim 10,
Line 2, delete "[ ]".

Signed and Sealed this

Twenty-sixth Day of March, 2002

Attest:

JAMES E. ROGAN
*Attesting Officer*    *Director of the United States Patent and Trademark Office*